United States Patent [19]
Factor et al.

[11] Patent Number: 5,907,026
[45] Date of Patent: May 25, 1999

[54] POLYCARBONATE COMPOSITIONS COMPRISING POLYESTER RESINS AND ULTRAVIOLET LIGHT ABSORBERS

[75] Inventors: Arnold Factor, Scotia; Randall Lee Carter, Clifton Park, both of N.Y.; Robert Russell Gallucci, Mt. Vernon, Ind.

[73] Assignee: General Electric Company, Schenectady, N.Y.

[21] Appl. No.: 08/924,414

[22] Filed: Aug. 27, 1997

[51] Int. Cl.⁶ .................................................. C08G 64/00
[52] U.S. Cl. ........................ 528/196; 528/146; 528/148; 528/439
[58] Field of Search ............................ 528/196; 525/146, 525/148, 439

[56] References Cited

U.S. PATENT DOCUMENTS 4,544,677  10/1985  Allen et al. .............................. 521/91

*Primary Examiner*—Terressa Mosley
*Attorney, Agent, or Firm*—Noreen C. Johnson; Douglas E. Stoner

[57] ABSTRACT

Weatherable polycarbonate compositions (formulations or blends) comprise polycarbonate, cycloaliphatic polyester resins, at least one of a benzotriazole, benzophenone, and triazine based UVA, and a catalyst quencher. The incorporation of the cycloaliphatic polyester resin and the benzotriazole, benzophenone, and triazine based UVA exhibits a synergistic effect, thereby resulting in unexpected enhanced protection of the polycarbonate compositions by imparting photostability to the polycarbonate formulations, thereby reducing yellowing or other forms of light induced degradation.

14 Claims, No Drawings

POLYCARBONATE COMPOSITIONS COMPRISING POLYESTER RESINS AND ULTRAVIOLET LIGHT ABSORBERS

FIELD OF INVENTION

The instant invention relates to weatherable compositions (blends/formulations) comprising polycarbonate, cycloaliphatic polyester resins, ultraviolet light absorbers, and a catalyst quencher.

BACKGROUND OF THE INVENTION

Formulations and blends comprising polycarbonates are known to degrade upon prolonged exposure to sunlight or other forms of light. One of the effects observed is yellowing of the polycarbonate blend/formulation. This problem has been partially alleviated by the use of light absorbers or light blockers in the polycarbonate blends. Thus ultraviolet light absorbers (UVA) are known to be used in polycarbonate formulations to protect these formulations from degradation due to exposure to different sources of light.

It has been known that aliphatic polyesters are resistant to light induced photo-yellowing in particular, because they do not absorb light wavelengths normally encountered in outdoor exposure. Blends of polycarbonates and poly(1,4-cyclohexanedimethanol-1,4-cyclohexanedicarboxylate) (PCCD) have been studied and reported in Polymer International, 36, 127 (1995) and the *Journal of Physics: Condensed Matter*, 8, 311 (1996). However, their photostability has not been examined.

The use of light stabilizing additives, UVA's in particular, to improve the photostability of polymers is known. Use of UVA's, however, does not offer a complete protection of polycarbonate formulations from light induced degradation or discoloration. There is thus a continued need for a formulation that will help protect polycarbonate based formulations/blends from degradation or discoloration due to exposure to light.

It has been surprisingly found that use of at least one of a benzotriazole, benzophenone, and a triazine based UVA, in compositions comprising polycarbonate and cycloaliphatic polyester resins exhibits a synergistic effect and, affords enhanced protection and increased weatherability, to the polycarbonate compositions against light induced degradation. This synergistic increase in weatherability, is greater than the additive protective effect of the polyester resin and the UVA. The protection afforded is generally measured in terms of the Yellowness Index (YI). Improvements in retention of gloss and mechanical properties are also expected.

SUMMARY OF THE INVENTION

The instant invention provides a composition comprising a polycarbonate, a cycloaliphatic polyester resin, at least one of a benzotriazole, benzophenone, and triazine based UVA, and a catalyst quencher. Incorporation of the benzotriazole, benzophenone, and triazine based UVA, and a cycloaliphatic polyester resin in the polycarbonate composition surprisingly displays a synergistic effect in protecting the polycarbonate compositions from the undesired degradation or discoloration due to exposure to light, thereby rendering weatherable polycarbonate compositions.

DETAILED DESCRIPTION OF THE INVENTION

The instant invention provides a composition comprising, a polycarbonate, a cycloaliphatic polyester resin, at least one of a benzotriazole, benzophenone, and triazine based UV absorber, and a catalyst quencher. Another embodiment of the invention provides a composition wherein, (a) the polycarbonate and the cycloaliphatic polyester resin, taken together, comprise from about 70% to about 99.94% by weight of the total composition, the ratio of the polycarbonate to the cycloaliphatic polyester resin being from about 50:50 to about 90:10; (b) the benzotriazole, benzophenone, and triazine based UV absorber comprises from about 0.05% to about 10% by weight of the total composition; and (c) the catalyst quencher comprises from about 0.001% to about 3% by weight of the total composition. A further preferred embodiment provides a composition wherein the polycarbonate is BPA polycarbonate, the cycloaliphatic polyester resin is derived from a cycloaliphatic diol and a cycloaliphatic diacid. The preferred cycloaliphatic resin being poly(1,4-cyclohexanedimethanol-1,4-cyclohexanedicarboxylate) (PCCD), and further, wherein the ratio of the BPA polycarbonate to PCCD is from about 60:40 to about 75:25.

Other preferred embodiments of the instant invention provide a composition wherein the benzotriazole, benzophenone, or triazine based UVA comprises from about 0.3% to about 10% by weight of the total composition. Another preferred embodiment provides a composition wherein the benzotriazole, benzophenone, or triazine based UVA comprises from about 0.3% to about 1% by weight of the total composition.

The ultraviolet light absorbers (UVA) useful in the present invention are those which are generally compatible with polycarbonates. Preferred are benzotriazole, benzophenone, and triazine based UVA represented by the following structural formula:

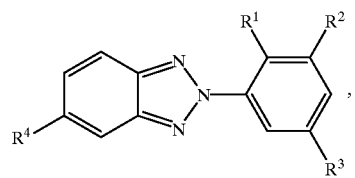

Formula I

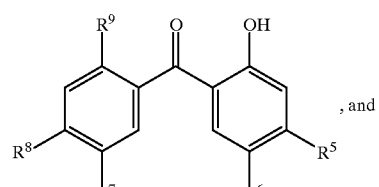

Formula II

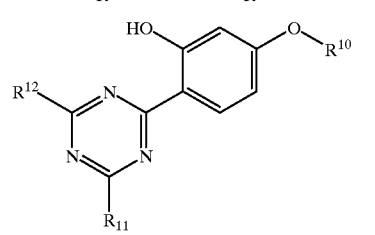

Formula III wherein:

$R^1$ is OH or $SO_2C_6H_5$;

$R^2$ is H, $C_1$–$C_{15}$ branched or straight chain alkyl, $C(CH_3)_2H_5$,

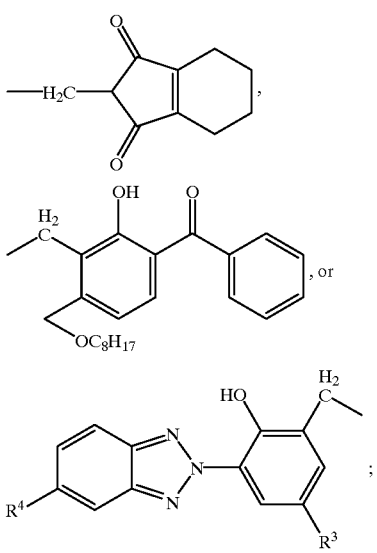

$R^3$ is H, $C_1$–$C_{15}$ branched or straight chain alkyl, —C(CH$_3$)$_2$C$_6$H$_5$, —(CH$_2$)$_2$—C(O)—O—C$_8$H$_{17}$, —CH$_2$—CH$_2$—C(O)—O—(C$_2$H$_4$O)$_8$—H, —CH$_2$CH$_2$—O—C(O)—C(CH$_3$)=CH$_2$, or —C(Ph)$_2$—CH$_3$;

$R^4$ is H, $C_1$–$C_6$ alkyl, or a halogen;

$R^5$ is H, OH, —OC$_1$–C$_{12}$alkyl, —O—CH$_2$CH=CH$_2$, —O—(CH$_2$)$_3$Si(OEt)$_3$, OCH$_2$COOH, —O(CH$_2$)$_2$OC(O)—CH=CH$_2$, —OCH$_2$CH$_2$OH, or —O—CH$_2$—CH(OH)—CH$_2$O—C$_8$H$_{17}$;

$R^6$ is H, benzoyl, SO$_3$H, or SO$_3$Na;

$R^7$ is H, $C_1$–$C_6$ alkyl, SO$_3$H, or SO$_3$Na;

$R^8$ is H, OH, OCH$_3$, $C_1$–$C_6$ alkyl, or —C(CH$_3$)$_3$;

$R^9$ is H or OH;

$R^{10}$ is —$C_1$–$C_{10}$ alkyl, or —$C_{1-6}$ branched or straight chain alkyl—O—$C_{10}$–$C_{15}$ straight chain alkyl; and $R^{11}$ and $R^{12}$ independently represent a phenyl radical optionally substituted with up to two $C_1$–$C_4$ alkyl substituents.

Further preferred UVA are those represented by Formula I, Formula II, and Formula IIII wherein:

$R^1$ is OH;

$R^2$ is C(CH$_3$)$_3$, C(CH$_3$)$_2$C$_2$H$_5$, C(CH$_3$)$_2$Ph, or CH(CH$_3$)C$_2$H$_5$;

$R^3$ is CH$_3$, C(CH$_3$)$_3$, C(CH$_3$)$_2$Ph, CH$_2$—CH$_2$—C(O)—O—(C$_2$H$_4$OH)$_8$, or C(CH$_3$)$_2$CH$_2$—C(CH$_3$)$_3$;

$R^4$ is H or Cl;

$R^5$ is OH or OC$_1$–C$_4$ alkyl;

$R^6$ is H;

$R^7$ is H;

$R^8$ is H, OH, or OCH$_3$;

$R^9$ is H or OH;

$R^{10}$ is $C_{1-4}$ alkyl; and $R^{11}$ and $R^{12}$ independently represent a phenyl radical substituted with $C_{1-12}$ alkyl.

Specifically preferred UVA's are 2-(2-hydroxy-5-t-octylphenyl)-benzotriazole (Tinuvin® 234), 2-(2-hydroxy-3,5-dicumylphenyl)-benzotriazole (Mixxim® BB/200), or bis[2-hydroxy-5-methyl-3-(benzotriazoly-2yl)phenyl] methane (Cyasorb® UV 5411).

The diols useful in the preparation of the cycloaliphatic polyester resins of the present invention are straight chain, branched, or cycloaliphatic, preferably cycloalkane diols, and may contain from 2 to 12 carbon atoms. Examples include, but are not limited to, ethylene glycol, propylene glycol, i.e., 1,2- and 1,3-propylene glycol, butane diol, i.e., 1,3- and 1,4-butane diol, diethylene glycol, 2,2-dimethyl-1,3-propane diol, 2-ethyl, 2-methyl, 1,3-propane diol, 1,3- and 1,5-pentane diol, dipropylene glycol, 2-methyl-1,5-pentane diol, 1,6-hexane diol, 1,4-cyclohexane dimethanol and particularly its trans isomer, dimethanol decalin, triethylene glycol, 1,10-decane diol, dimethanol bicyclooctane, and mixtures of any of the foregoing. Particularly preferred is dimethanol bicyclooctane, dimethanol decalin, or another cycloaliphatic diol or chemical equivalent thereof and particularly 1,4-cyclohexane dimethanol or its chemical equivalents. When using cycloaliphatic diol components, a mixture of cis- and trans isomers may be employed, the ratio ranging from about 1:1 to about 1:5, and further a high trans isomer content (>70%) is most preferred. Mixtures of diols or chemical equivalents of the diols including esters and ethers, such as dialkylesters, diaryl esters, and the like can also be useful.

The diacids useful in the preparation of the cycloaliphatic polyester resins of the present invention are aliphatic diacids. This is meant to include carboxylic acids having two carboxyl groups each of which is attached to a saturated carbon. Preferred diacids are cyclo or bicyclo aliphatic, for example 1,4-cyclohexanedicaraboxylic acid and most preferred is trans-1,4-cyclohexanedicaraboxylic acid. Other cycloaliphatic acids include decahydronaphthalene dicarboxylic acid, norbornene dicarboxylic acids, bicyclooctane dicarboxylic acids. Mixtures of diacids, and linear aliphatic diacids are also useful provided the polyester has at least one monomer containing a cycloaliphatic ring. Illustrative examples of linear aliphatic diacids are succinic acid, adipic acid, dimethyl succinic acid, and azelaic acid.

Cyclohexanedicarboxylic acids and their chemical equivalents can be prepared, for example, by the hydrogenation of cycloaromatic diacids and corresponding derivatives such as isophthalic acid, terephthalic acid or naphthalene dicarboxylic acids in a suitable solvent, water or acetic acid at room temperature and at atmospheric pressure using suitable catalysts such as rhodium supported on a suitable carrier of carbon or alumina. See, Friefelder et al., *Journal of Organic Chemistry*, 31, 3438 (1966); U.S. Pat. Nos. 2,675,390 and 4,754,064. They may also be prepared by the use of an inert liquid medium in which a acid is at least partially soluble under reaction conditions and a catalyst of palladium or ruthenium in carbon or silica. See, U.S. Pat. Nos. 2,888,484 and 3,444,237.

Typically, during hydrogenation, two or more isomers are obtained in which the carboxylic acid groups are in cis- or trans-positions. The cis- and trans-diastereomers can be separated by crystallization with or without a solvent, for example, n-heptane, or by distillation. The cis-isomer tends to blend better; however, the trans-diastereomer has higher melting and crystallization temperatures and is especially preferred. Mixtures of the cis- and trans-diastereomers are useful herein as well, and preferably when such a mixture is used, the trans-isomer will comprise at least about 70 parts by weight and the cis-isomer will comprise the remainder based upon 100 parts by weight of cis- and trans-isomers combined. A mixture of diastereomers or more than one diacid may be used in the cycloaliphatic polyester resins of this invention.

Chemical equivalents of these diacids include esters, alkyl esters, diaryl esters, anhydrides, acid chlorides, acid bromides, salts, and the like. The preferred chemical equivalents comprise the dialkyl esters of the cycloaliphatic diacids, and the most preferred chemical equivalent comprise the dimethyl ester of the acid, particularly dimethyl-trans-1,4-cyclohexanedicarboxylate.

Dimethyl-1,4-cyclohexanedicarboxylate can be obtained by ring hydrogenation of dimethylterephthalate, and two diastereomers having the carboxylic acid groups in the cis- and trans-positions are obtained. The diastereomers can be separated, the trans-isomer being especially preferred. Mixtures of the isomers are suitable as explained above and preferably in the ratios as explained above.

The polyester resins of the present invention are typically obtained through the condensation or ester interchange polymerization of the diol or diol equivalent component with the diacid or diacid chemical equivalent component and having recurring units of the Formula IV:

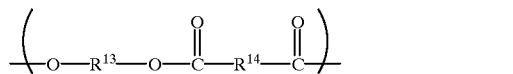

Formula IV wherein $R^3$ represents an alkyl or cycloalkyl radical containing 2 to 12 carbon atoms and which is the residue of a straight chain, branched, or cycloaliphatic alkane diol having 2 to 12 carbon atoms or chemical equivalents thereof; and $R^{14}$ is an alkyl or a cycloaliphatic radical which is the decarboxylated residue derived from a diacid, with the proviso that at least one of $R^{13}$ or $R^{14}$ is a cycloalkyl group.

A Preferred cycloaliphatic polyester is poly(1,4-cyclohexane-dimethanol-1,4-cyclohexanedicarboxylate) (PCCD) having recurring units of Formula V:

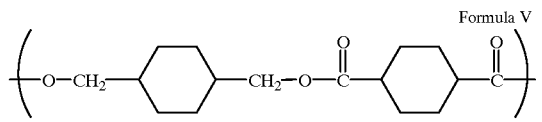

Formula V wherein $R^{13}$ is a cyclohexane ring, and wherein $R^{14}$ is a cyclohexane ring derived from cyclohexanedicarboxylate or a chemical equivalent thereof and is selected from the cis- or trans-isomer or a mixture of cis- and trans-isomers thereof.

Cycloaliphatic polyesters resins of the instant invention can be generally made following the teachings of, for example, U.S. Pat. No. 2,465,319, which is incorporated herein by reference. The reaction is generally run in the presence of a suitable catalyst such as a tetrakis(2-ethyl hexyl)titanate, in a suitable amount, typically about 50 to 400 ppm of titanium based upon the final product.

As used in the instant invention, a polycarbonate comprises multiple structural units represented by the formula

Formula VI wherein $A^1$ is a divalent aromatic hydrocarbon radical. Suitable $A^1$ radicals include m-phenylene, p-phenylene, 4,4'-biphenylene, 4,4'-bi(3,5-dimethyl)-phenylene, 2,2-bis(4-phenylene)propane and similar radicals such as those which correspond to the dihydroxy-substituted aromatic hydrocarbons disclosed by name or formula (generic or specific) in U.S. Pat. No. 4,217,438.

The $A^1$ radical preferably has the formula

Formula VII wherein each of $A^2$ and $A^3$ is a mono cyclic divalent aromatic hydrocarbon radical and Y is a bridging radical in which one or two atoms separate $A^2$ from $A^3$. The free valence bonds in formula VI are usually in the meta or para positions of $A^2$ and A3 in relation to Y. Compounds in which $A^1$ has formula VII are bisphenols, and for the sake of brevity the term "bisphenol" is sometimes used herein to designate the dihydroxy-substituted aromatic hydrocarbons; it should be understood, however, that non-bisphenol compounds of this type may also be employed as appropriate.

In formula VII, the $A^2$ and $A^3$ values may be unsubstituted phenylene or hydrocarbon-substituted or halogen-substituted derivatives thereof, illustrative substituents (one or more) being alkyl and alkenyl. Unsubstituted phenylene radicals are preferred. Both $A^2$ and $A^3$ are preferably p-phenylene, although both may be o- or m-phenylene or one o- or m-phenylene and the other p-phenylene.

The bridging radical, Y, is one in which one or two atoms, preferably one, separate $A^2$ from $A^3$. Illustrative radicals of this type are methylene, cyclohexylmethylene, 2-[2.2.1 ]-bicycloheptylmethylene, ethylene, isopropylidene, neopentylidene, cyclohexylidene, cyclopentadecylidene, cyclododecylidene and adamantylidene; gem-alkylene (alkylidene) radicals are preferred. Also included, however, are unsaturated radicals. The bridging radical Y can also be O, $SO_2$, SO, or S. Bisphenols wherein $A^2$ and $A^3$ are directly linked are also useful. For reasons of availability and particular suitability for the purposes of this invention, the preferred bisphenol is 2,2-bis(4-hydroxyphenyl)propane ("BPA"), in which Y is isopropylidene and $A^2$ and $A^3$ are each p-phenylene. A detailed description of polycarbonates used in the instant invention is described in U.S. Pat. No. 5,441,997 and is incorporated herein by reference.

As used in the instant invention, a quencher is a phosphite represented by Formula VIII:

Formula VIII wherein $R^{16}$, $R^{17}$, and $R^{18}$ are independently selected from the group consisting of H, alkyl, aryl, alkyl substituted aryl, and wherein at least one of $R^{16}$, $R^{17}$, and $R^{18}$ is H or alkyl. Preferred quenchers are phosphorus oxo acids. Phosphoric acid and phosphorous acid are more preferred.

The enhanced protection afforded to the polycarbonate compositions in Examples 5 and 6, by the incorporation of UVA, is most likely independent of the structure of the UVA used and the aliphatic polyester resin used. UVA's can also be used in combination with conventional antioxidants, such as hindered phenols, phosphites, and thioesters. Preferred hindered phenols are octadecyl 3,5-bis(1,1-dimethyl)-4-hydroxy benzenepropanoate (Irganox® 1076), 2,2-bis[[3-[3, 5-bis(1,1-dimethylethyl)-4-hydroxyphenyl]-1-oxopropoxy] methyl]-1,3-propanediyl-3,5-bis(1,1-dimethylethyl)-4-hydroxybenzenepropanoate (Irganox® 1010) and 4,4',4"-[(2,4,6-trimethyl-1,3,5-benzenetriyl) tris (methlylene)] tris [2,6-bis(1,1-dimethylethyl)]phenol (Irganox® 1330), sold by Ciba Specialty Chemicals.

Cycloaliphatic polyester resins that produce transparent, miscible blends with polycarbonates are preferred. Catalyst quenchers, as used herein, are agents that quench any residual polymerization catalyst that may have been left behind from the synthesis of the polycarbonate or the cycloaliphatic polyester resin. A detailed description of the catalyst quencher can be found in U.S. Pat. No. 5,441,997, and is incorporated herein by reference. Preferred quenchers give transparent, colorless blends.

Also, as used herein, additives may include such materials as colorants, whitening agents, thermal stabilizers, impact modifiers, extenders, antistatic agents, and processing aids. The different additives that can be incorporated in the compositions of the instant invention are commonly used and known to one skilled in the art. Illustrative descriptions of such additives may be found in R. Gachter and H. Muller, Plastics Additives Handbook, $4^{th}$ edition, 1993, and are incorporated herein by reference.

EXPERIMENTAL

Compositions comprising BPA polycarbonate (BPA-PC), poly(1,4-cyclohexanedimethanol-1,4-cyclohexanedicarboxylate) (PCCD), a UVA, and a catalyst quencher were prepared by the general procedure outlined below. These compositions were generally transparent. The improved efficacy of UVA in blends of BPA polycarbonate with PCCD is appreciated by comparing the weatherability of BPA-PC and the BPA-PC/PCCD blends with and without UV absorbers.

The blends of interest consisted of BPA-PC, PCCD, benzotriazole based UVA, and phosphorous acid (0.08% by weight, using a 45% aqueous-phosphorous acid solution). The phosphorous acid acts as a catalyst quencher to quench the residual polymerization catalyst, that may have been left behind from the synthesis of the polycarbonate or the cycloaliphatic polyester resin, thereby preventing trans esterification of the PCCD and BPA-PC. Formulations were prepared with and without 0.3% (by weight) of Cyasorb® UV 5411, a benzotriazole based UVA, a product of Cytec Industries. The formulations were blended by means of a mixer then extruded on a 30 mm vacuum vented twin screw extruder at 250° C. and 250 rpm. Pellets were dried for 3h at 125° C. and injection molded on an 80 Ton van Dorn machine set at 250° C., mold temperature of 65° C., at 30 seconds per cycle into transparent plaques 2"×3"×⅛" under standard conditions.

The plaques were exposed in an Atlas Ci35a xenon arc Weather-Ometer equipped with Type S borosilicate inner and outer filters. The light cycle was 160 minutes long with an irradiance of 0.77 W/m² at 340 nm, black panel temperature of 75° C., dry bulb temperature of 45° C., and wet bulb depression of 10° C. There was a 20 minute dark cycle with water spray during the last 15 minutes. Exposure is measured in total kilojoules (kJ) of irradiance at 340 nm.

The change in Yellowness Index (ΔYI, ASTM D-1925) of the plaques relative to their initial values, as well as the degree of improvement relative to the control BPA-PC (Ex.1) are shown in Table 1.

TABLE 1

Photo yellowing of Transparent BPA-PC/PCCD Blends

|   |   | 1205 kJ | | 1570 kJ | |
|---|---|---|---|---|---|
|   |   | ΔYI | Improvement* | ΔYI | Improvement* |
| 1 | BPA-PC | 10.8 | 0 (0%) | 12.9 | 0 (0%) |
| 2 | BPA-PC (90%) + PCCD (10%) | — | — | 11.3 | 1.6 (12%) |
| 3 | BPA-PC (70%) + PCCD (30%) | 9.7 | 1.1 (10%) | 10.3 | 2.6 (20%) |
| 4 | BPA-PC + UVA (0.3%) | 3.1 | 7.7 (71%) | 4.8 | 8.1 (63%) |
| 5 | BPA-PC (89.73%) + PCCD (9.97%) + UVA (0.299%)** | — | — | 2.6 | 10.3 (80%) |
| 6 | BPA-PC (69.79%) + PCCD (29.91%) + UVA (0.299%)*** | 0.1 | 10.7 (99%) | 0.5 | 12.4 (96%) |

*Improvement is calculated by subtracting the YI for a given example from the YI of Example 1, i.e., $YI_{(BPA-PC)} - YI$; % improvement is equal to $100 \times \Delta YI/YI_{(BPA-PC)} - YI$
**Ratio of BPA-PC:PCCD = 90:10
***Ratio of BPA-PC:PCCD = 70:30

Incorporation of PCCD improves the weatherability of transparent BPA-PC only slightly, as observed by comparing Example 1, which comprises only BPA-PC, with Examples 2 and 3, which comprise BPA-PC and PCCD, in Table 1. Comparing Examples 1–3 demonstrates that the weatherability, measured in terms of the YI, increases, only slightly (about 10–20%), with PCCD incorporation. The use of a UVA provides a greater improvement in BPA-PC, however, the combination of UVA and PCCD imparts a much more dramatic improvement (about 80% to 99%) in the weatherability, as measured by the YI index, illustrated by comparing Examples 5, and 6 with Examples 1, 2 and 3.

TABLE 2

Improved Weatherability of Transparent BPA-PC/PCCD Blends

|   | 1205 kJ | | 1570 kJ | |
|---|---|---|---|---|
|   | Actual Improvement | Calculated* Improvement | Actual Improvement | Calculated* Improvement |
| Ex. 5: BPA-PC (89.73%) + PCCD (9.97%) + UVA (0.299%)** | | | 10.3 (80%) | 9.7 (75%) |
| Ex. 6: BPA-PC (69.79%) + PCCD (29.91%) + UVA (0.299%)*** | 10.7 (99%) | 8.8 (81%) | 12.4 (96%) | 10.7 (83%) |

*Calculated improvement is obtained from the data in Table 1 by summing the observed improvements for PCCD and UVA alone in BPA-PC; % improvement is equal to $100 \times \Delta YI/YI_{(BPA-PC)} - YI$
**Ratio of BPA-PC:PCCD = 90:10
***Ratio of BPA-PC:PCCD = 70:30

The effectiveness of the PCCD and UVA combination in BPA-PC is greater than the additive effect of PCCD and UVA. Table 2 summarizes the observed improvement in the blends (Examples 5 and 6) relative to the control BPA-PC (Example 1) and the calculated improvement expected for the compositions in Examples 5 and 6 if the effects of the benzotriazole based UVA and PCCD were additive. The data in Table 2 indicates that the use of a benzotriazole based UVA in the BPA-PC/PCCD blend exhibits a synergistic effect with PCCD and provides a significantly greater than expected improvement in the weatherability of the polycarbonate compositions.

What is claimed is:

1. A composition comprising:
   (a) polycarbonate;
   (b) a cycloaliphatic polyester resin;
   (c) at least one of a benzotriazole, benzophenone, and triazine based UVA, said triazine based UVA having the formula

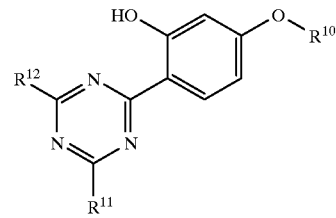

wherein:
   $R^{10}$ is —$C_1$–$C_{10}$ alkyl, or $C_{1-6}$ branched or straight chain alkyl-O-$C_{10-15}$ straight chain alkyl; and
   $R^{11}$ and $R^{12}$ independently represent a phenyl radical optionally substituted with up to two $C_1$–$C_4$ alkyl substituents; and
   (d) a catalyst quencher.

2. A composition of claim 1 wherein:
   (a) the polycarbonate and the cycloaliphatic polyester resin taken together comprise from about 70% to about 99.94% by weight of the total composition, the ratio of the polycarbonate to the cycloaliphatic polyester resin being from about 50:50 to about 90:10;

(b) the benzotriazole, benzophenone, and triazine based UVA comprises from about 0.05% to about 10% by weight of the total composition; and (c) the catalyst quencher comprises from about 0.01% to about 1% by weight of the total composition.

3. A composition of claim 2 wherein the polycarbonate is BPA polycarbonate, and the cycloaliphatic polyester resin is derived from a cycloaliphatic diol and a cycloaliphatic diacid.

4. A composition of claim 3 wherein the cycloaliphatic polyester resin is PCCD.

5. A composition of claim 4 wherein, the ratio of the polycarbonate to the cycloaliphatic polyester resin is from about 60:40 to about 75:25.

6. A composition of claim 5 wherein the benzotriazole, benzophenone, and triazine based UVA comprises from about 0.3% to about 7% by weight of the total composition.

7. A composition of claim 6 wherein the benzotriazole, benzophenone, and triazine based UVA comprises from about 4% to 7% by weight of the total composition.

8. A composition of claim 7 wherein the benzotriazole, benzophenone, and triazine based UVA comprises from about 0.3% to about 1% by weight of the total composition.

9. A composition of claim 8 wherein the benzotriazole and benzophenone based UVA is represented by:

Formula I

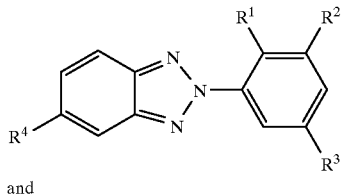

and

Formula II

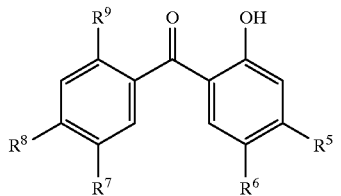

wherein:

$R^1$ is OH;

$R^2$ is H, $C_1$–$C_{15}$ branched or straight chain alkyl, $C(CH_3)_2C_6H_5$,

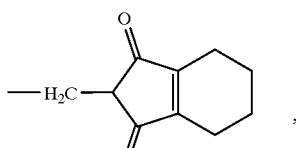

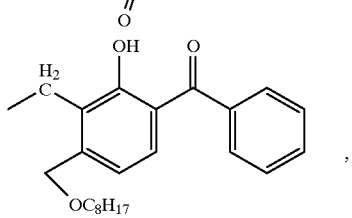

or

-continued

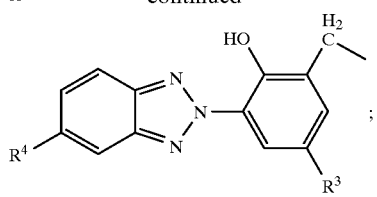

$R^3$ is H, $C_1$–$C_{15}$ branched or straight chain alkyl, —C(CH$_3$)$_2$Ph, —(CH$_2$)$_2$—C(O)—O—C$_8$H$_{17}$, —CH$_2$—CH$_2$—C(O)—O—(C$_2$H$_4$O)$_8$—H, —CH$_2$CH$_2$—O—C(O)—C(CH$_3$)=CH$_2$, or —C(Ph)$_2$—CH$_3$;

$R^4$ is H or Cl;

$R^5$ is H, OH, —OC$_1$–C$_{12}$alkyl, —O—CH$_2$CH=CH$_2$, —O—(CH$_2$)$_3$Si(OEt)$_3$, —OCH$_2$COOH, —O(CH$_2$)$_2$OC(O)—CH=CH$_2$, —OCH$_2$CH$_2$OH, or —O—CH$_2$—CH(OH)—CH$_2$O—C$_8$H$_{17}$;

$R^6$ is H, benzoyl, SO$_3$H, or SO$_3$Na;

$R^7$ is H, C$_1$–C$_6$ alkyl, SO$_3$H, or SO$_3$Na;

$R^8$ is H, OH, OCH$_3$, or —C(CH$_3$)$_3$; and $R^9$ is H or OH.

10. A composition of claim 9 wherein:

$R^2$ is C(CH$_3$)$_3$, C(CH$_3$)$_2$C$_2$H$_5$, C(CH$_3$)$_2$Ph, or CH(CH$_3$)C$_2$H$_5$;

$R^3$ is CH$_3$, C(CH$_3$)$_3$, C(CH$_3$)$_2$Ph, CH$_2$—CH$_2$—C(O)—O—(C$_2$H$_4$OH)$_8$, or C(CH$_3$)$_2$CH$_2$—C(CH$_3$)$_3$;

$R^4$ is H;

$R^5$ is OH or OC$_1$–C$_4$ alkyl;

$R^6$ is H;

$R^7$ is H;

$R^8$ is H, OH, or OCH$_3$;

$R^9$ is H or OH;

$R^{10}$ is C$_{1-4}$ alkyl; and $R^{11}$ and $R^{12}$ independently represent a phenyl radical substituted with C$_{1-2}$ alkyl.

11. A composition of claim 10 wherein the UVA is 2-(2-hydroxy-5-t-octylphenyl)-benzotriazole, or 2-(2-hydroxy-3,5-dicumylphenyl)-benzotriazole, or bis[2-hydroxy-5-methyl-3-(benzotriazoly-2yl)phenyl] methane.

12. A composition of claim 9 wherein the catalyst quencher is a phosphite represented by Formula VIII:

Formula VIII

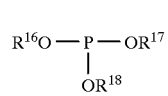

wherein $R^{16}$, $R^{17}$, and $R^{18}$ are independently selected from the group consisting of H, alkyl, aryl, alkyl substituted aryl, and wherein at least one of $R^{16}$, $R^{17}$, and $R^{18}$ is H or alkyl.

13. A composition of claim 12 wherein the catalyst quencher is a phosphorus oxo acid.

14. A composition of claim 13 wherein the catalyst quencher is phosphoric acid or phosphorous acid.

* * * * *